Patented June 16, 1931

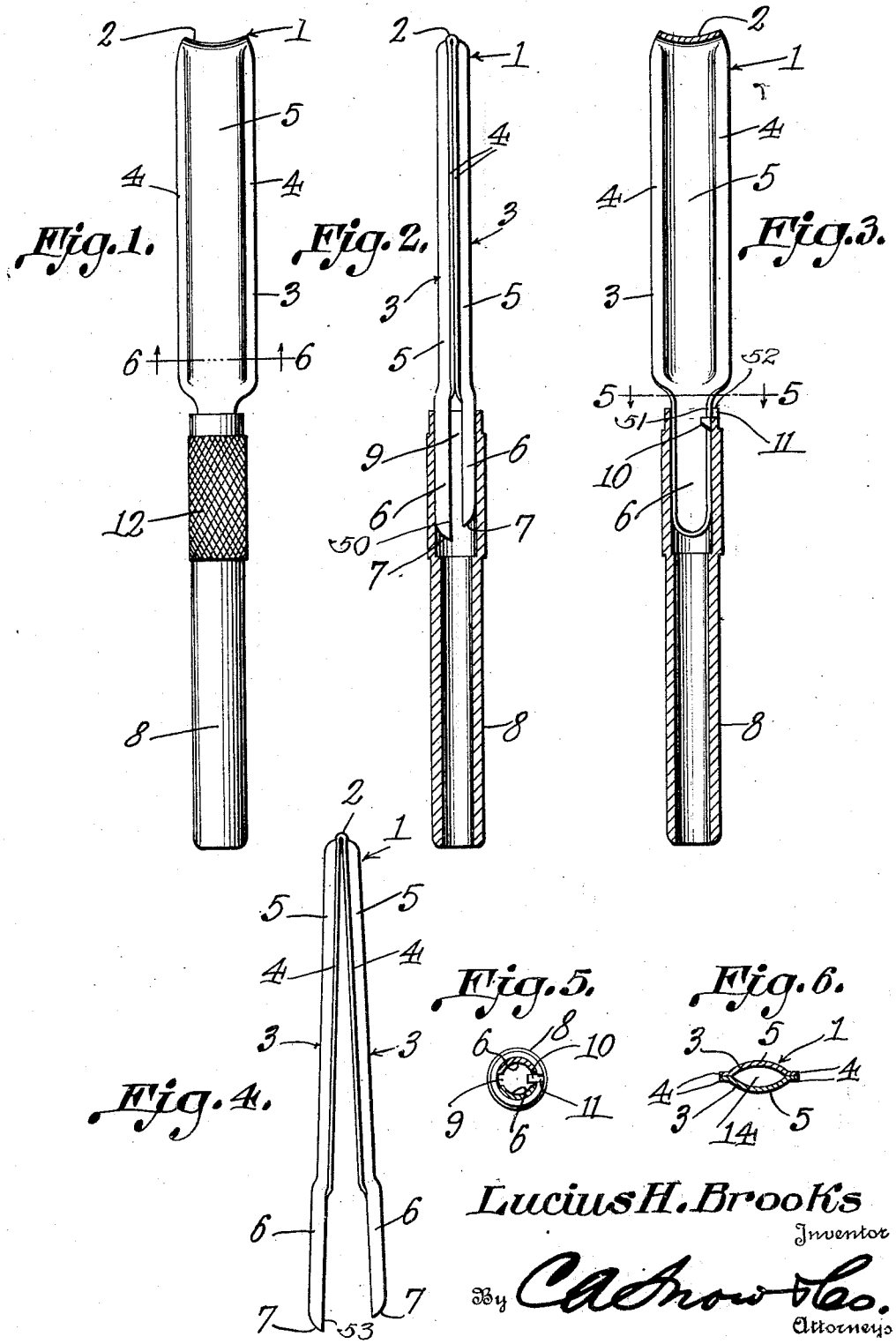

1,810,265

UNITED STATES PATENT OFFICE

LUCIUS HOMER BROOKS, OF ATLANTA, GEORGIA

RAZOR STROPPER

Application filed December 1, 1927. Serial No. 237,054.

This invention aims to provide a holder for razor blades during the stropping of the blades, the device being so constituted that it will accommodate blades of widely varied sorts, novel means being provided for holding the blade-grip in a tubular handle.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention;

Figure 2 is a view wherein the article is shown at right angles to the disclosure of Figure 1, the handle being in section;

Figure 3 is a longitudinal section taken through the grip and the handle;

Figure 4 is an elevation of the grip, opened,

Figure 5 is a cross section on the line 5—5 of Figure 3;

Figure 6 is a cross section on the line 6—6 of Figure 1.

The device forming the subject matter of this application includes a grip 1 made of a single piece of resilient and non-rusting metal, bent upon itself at 2 to form oppositely disposed arms 3 having flat cooperating gripping flanges 4 along their longitudinal edges and cooperating outwardly convexed ribs 5 between the gripping flanges. The arms 3 terminate in reduced fingers 6 of different lengths, the ends of the fingers being inwardly beveled, as shown at 7. The fingers are trough-shaped in cross section, as shown in Figure 5, so as to fit closely but detachably in a tubular handle 8 which, like the grip 1, preferably is made of non-rusting metal.

The fingers 6 are spaced apart, as shown at 9, to enhance their resiliency, and to receive, between them, an inwardly projecting detent 10 on the handle 8. The detent or projection 10 may be formed by notching the end of the handle 8, as at 11, the metal thus freed being turned inwardly. Any convenient portion of the handle 8 may be knurled or otherwise roughened as indicated at 12, to secure a better hand hold.

The flanges 4 enable the device to hold a thin flat blade having one or more cutting edges. The ribs 5 form a space 14 in which the back edge of a thick wedge-shaped blade may be received, the resiliency of the grip 1 being sufficient to accommodate such a blade between the arms 3. Because the fingers 6 are of different lengths, and inwardly beveled as at 7, the fingers may the more easily be inserted into the handle 8, wherein they are received with a reasonably tight friction fit. The detent 10 which extends between the fingers 6, prevents relative rotation between the grip 1 and the handle 8. The spacing at 9, between the fingers 6, not only accommodates the detent 10, but enhances the resiliency of the fingers 6, as well, so that they will fit snugly in the end of the handle 8.

The device is of simple and inexpensive two-piece construction and may be turned out at trifling expense.

The difference 50 in the length of the arms 3 is greater than the distance 51 between the projection 10 and the outer end surface 52 of the handle 8, whereby the projection will first ride along the inner edge 53 of the long arm and then pass between the arms, thereby facilitating the insertion of the arms into the handle, the arms being inwardly beveled at 7 to engage with the outer end surface 52 of the handle, the difference 50 in the length of the arms causing the said beveled portions 7 to engage one at a time with the outer end surface 52 of the handle, thereby facilitating the insertion of the arms into the handle.

What is claimed is:—

A device of the class described comprising a tubular handle provided near to its outer end with an inwardly-extended projection, and a blade-grip including long and short arms which are insertible into the handle, the difference in the length of the arms being greater than the distance between the projection and the outer end surface of the handle, whereby the projection will first ride along the inner edge of the long arm and then pass between the arms, thereby facilitating the insertion of the arms into the handle, the arms being inwardly beveled to engage with the outer end surface of the handle, the difference in the length of the arms causing the said beveled portions to engage one at a time with the outer end surface of the handle, thereby facilitating the insertion of the arms into the handle.

In testimony that I claim the foregoing as my own, I have hereto affixed my signature.

LUCIUS HOMER BROOKS.